(12) United States Patent
Walker et al.

(10) Patent No.: US 6,199,014 B1
(45) Date of Patent: *Mar. 6, 2001

(54) SYSTEM FOR PROVIDING DRIVING DIRECTIONS WITH VISUAL CUES

(75) Inventors: Jay S. Walker, Ridgefield, CT (US); Toby Weir-Jones, Vancouver (CA)

(73) Assignee: Walker Digital, LLC, Stamford, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/997,677

(22) Filed: Dec. 23, 1997

(51) Int. Cl.[7] .................................................. G01C 21/26
(52) U.S. Cl. ........................................... 701/211; 340/995
(58) Field of Search ..................................... 701/211, 209, 701/208, 201, 213; 340/995; 342/357.13

(56) References Cited

U.S. PATENT DOCUMENTS

| 4,937,751 | * | 6/1990 | Nimura et al. ........................ 340/995 |
| 4,951,211 |   | 8/1990 | De Villeroche . |

(List continued on next page.)

FOREIGN PATENT DOCUMENTS

| 0 751 376 | * | 1/1997 | (EP) .............................. G01C/21/20 |
| 5113754   |   | 5/1993 | (JP) . |
| 8128848   |   | 5/1996 | (JP) . |
| 8328466   |   | 12/1996 | (JP) . |

OTHER PUBLICATIONS

"We Have A Winner", Sacramento Bee, May 11, 1996 at p. G1.

Doug Henschen, "Popular Map Site Will Offer 'GeoCentric' Targeting", DM News, Jan. 27, 1997 at p. 18.

(List continued on next page.)

Primary Examiner—Gregory C. Issing
(74) Attorney, Agent, or Firm—Brian M. Dugan; Nathaniel Levin

(57) ABSTRACT

A system and method are described for providing navigational instructions including representations of photographs of geographical locations along the route to be traveled. Geographical information and photographic information are stored in databases; the photographic information includes representations of photographs of actual geographic locations. The coordinates of each location photographed are also stored. Each of the representations of photographs is matched with the geographical information, thereby associating the photograph with the geographical information regarding the location depicted therein. The starting and destination points, geographic information and photographic information are processed to determine a route for travel to the destination point. Navigational instructions for traveling the route are generated, including representations of photographs. The navigational instructions and the photographic representations of geographic locations are outputted in a sequence, thereby providing a sequence of directions and photographic representations of geographic locations along the route.

6 Claims, 10 Drawing Sheets

U.S. PATENT DOCUMENTS

| | | | |
|---|---|---|---|
| 4,992,947 | * | 2/1991 | Nimura et al. .................... 701/211 |
| 4,994,971 | | 2/1991 | Poelstra . |
| 5,043,902 | * | 8/1991 | Yokoyama et al. ................ 701/211 |
| 5,103,400 | * | 4/1992 | Yamada et al. .................... 701/211 |
| 5,214,793 | | 5/1993 | Conway et al. . |
| 5,381,338 | * | 1/1995 | Wysocki et al. .................... 701/213 |
| 5,396,431 | | 3/1995 | Shimizu et al. . |
| 5,442,557 | | 8/1995 | Kaneko . |
| 5,537,323 | | 7/1996 | Schulte . |
| 5,559,949 | | 9/1996 | Reimer et al. . |
| 5,587,911 | | 12/1996 | Asano et al. . |
| 5,596,494 | | 1/1997 | Kuo . |
| 5,610,822 | | 3/1997 | Murphy . |
| 5,614,898 | | 3/1997 | Kamiya . |
| 5,646,629 | | 7/1997 | Loomis et al. . |
| 5,648,768 | | 7/1997 | Bouve . |
| 5,659,469 | | 8/1997 | Deaton . |
| 5,689,252 | * | 11/1997 | Ayanoglu et al. .................... 340/991 |

OTHER PUBLICATIONS

"Smart Business Supersite Newsletter Profile", Global Positioning & Navigation News, (http://www.smartbiz.com/sbs/pubs/nl39.htm), download date: Oct. 3, 1997.

"An HCI Analysis and Design of CANS: A Computerized Automobile Navigation System", Monica M. Pate, Graduate Student in Information Design and Technology at Georgia Tech, (http://www.lcc.gatech.edu/~mpate/HCI.HTM), download date: Oct. 3, 1997.

"Database Requirements for Vehicle Navigation Systems", NCGIA Maine, (http://negia.umesve.maine.edu/~max/UM-final.htm), download date: Oct. 3, 1997.

"Finding The Goods On The Net", Conde Nast Traveler, Jan. 1998 at p. 40.

* cited by examiner

| RECORD ID 501 | BINARY PHOTOGRAPH DATA 502 | PHOTOGRAPH SOURCE COORDINATES 503 | CARDINAL ORIENTATION 504 | STREET ADDRESS 505 |
|---|---|---|---|---|
| 02-83642-9961 | [PHOTOGRAPH] | 29.86243° NORTH 58.76774° WEST | FACING 162° | 65 PROSPECT ST. STAMFORD, CT 06901 |
| 05-16197-4233 | [PHOTOGRAPH] | 48.99689° NORTH 103.4577° WEST | FACING 83° | 1160 YEW ST. BLAINE, WA 98231 |

FIG. 5

| STARTING ADDRESS 601 | DESTINATION ADDRESS 602 | INTERSECTING VECTORS 603 | PHOTOGRAPHY DATABASE RECORD IDENTIFIERS 604 |
|---|---|---|---|
| 18 EAST 74TH ST. NEW YORK, NY 10021 | 4304 GLENBROK RD. RIVERDALE, NY 10034 | 863, 875, 903, 906, 1156, 1162 | 06-98321-1234, 05-12345-7642, 17-94226-5368 |
| 120 JAMES ST. ITHACA, NY 14850 | ERIE BLVD. SYRACUSE, NY 13692 | 1206, 1210, 1213, 1368, 1372 | 11-46820-1359, 11-46822-1362, 12-16937-6821 |

SYSTEM FOR PROVIDING DRIVING DIRECTIONS WITH VISUAL CUES

BACKGROUND OF THE INVENTION

This invention relates to the field of computerized navigation systems, and in particular, to such systems equipped with a database of image data in addition to the standard routing and directional data.

Computerized navigation systems are now available which enable a traveler to follow a customized route to his destination, without the use of conventional directions or printed maps. As these systems become more widely available, there will be an increasing need to make them easier to understand and to operate.

In this regard, it may be easier for some people to remember landmarks than the details of a printed map. People can become lost despite being given both a reasonable map and written directions on how to follow it. In comparison, directions that use objects in the environment that we are likely to notice are more easily followed; for example, "You'll drive for a couple of miles and then pass a bright red farmhouse all by itself; take the first left after that." Such instructions may be much easier to remember.

Accordingly, the ease of use of computerized navigation systems would be greatly enhanced if pictorial cues to the geographic data could be provided along with the navigation directions. Specifically, the directions provided by such systems would be easier to follow if the user could see a display of photographs of the actual locations along the route, in addition to the route being displayed in a text or map format.

In general, presently available enhancements to computerized navigation systems aim to convey additional information which a driver may use to streamline the navigation process. For example, some Japanese systems transmit data about accidents, traffic congestion, availability of parking, road construction, and other specialized data to in-vehicle navigation devices. Such a navigation system may take these data into account when planning routes. In addition, earlier work on synthesized speech and voice-control systems is being incorporated into in-vehicle navigation systems so that drivers need not take their eyes off the road to interact with the system, as reported in *Global Positioning & Navigation News*.

In one particular application of computerized navigation, systems incorporating Global Positioning System (GPS) receivers are installed in motor vehicles. Some GPS units, such as the GPS 4000, allow the user to define custom landmarks ("the old oak tree," "my favorite fishing hole"). These landmarks are shown on the unit's readout whenever the user approaches them.

Amtrak offers an on-line national map that describes every Amtrak route, scenery along the way, amenities, and seating and sleeping car accommodations. This is not useful to automotive and other travelers not using common carriers who need directions.

There are a number of maps, both print and computerized, that incorporate business logos. Various cities around the world have tourist-oriented maps that incorporate subject headings (restaurants, hotels, attractions) with logos of relevant businesses into a single interactive web-based map. Various web sites offer point-to-point driving directions between street addresses and/or cities in the United States, Canada, and occasionally, certain cities on other continents. In some instances, corporate logos are superimposed on maps as a way to identify features of interest to the traveler.

There are various single-user CD-ROM-based navigational products which may optionally be interfaced with portable GPS receivers to provide a real-time superimposition of the GPS location on the digital map. These products may include a variety of multimedia data, e.g. for users who specify San Francisco as their destination, the product might show a photograph of the Golden Gate Bridge. The location in the photograph may or may not be a useful landmark for a traveler following a customized route.

Several websites provide customized maps and driving directions. Several CD-ROMS, such as Travroute Software's Door-to-Door, also provide this service. MapQuest's maps have a feature called "points of interest" that lets the user choose a set of landmarks to be added to a custom map. For example, one could choose to display all the restaurants near one's destination; these would show up on the map as generic icons (such as a crossed knife and fork) and names. MapQuest also allows companies to pay to have their corporate logo displayed on the map, instead of a generic icon. However, these logos only appear on MapQuest's maps, and do not accompany driving directions. Travroute's Door-to-Door CD-ROM and the Freetrip website have similar features.

Northern Illinois University provides a campus tour planner on its website, including a clickable campus map with numbers indicating landmarks. Clicking on one of the numbers results in a display of a picture and description of the landmark. This may be viewed as a very small database of photographs for use in navigation. However, this system does not assemble the photographs into a set of customized directions for getting from one point to another.

Databases of photographs have been used in navigation for robots. One solution to the problem of getting a robot from one point to another is to have it store images of various points along its route, then retrace the route by matching what it sees with images in its database. This system does not, of course, create directions or maps that would be useful to a human.

"Database Requirements for Vehicle Navigation Systems," published by the National Center for Geographic Information and Analysis (NCGIA) at the University of Maine, describes different data types and properties necessary for the system to associate adjacent spaces together in an effort to plan a multi-step route. This paper also notes that the U.S. Census Bureau's TIGER (Topologically Integrated Geographic Encoding and Referencing) files, which provide sufficient detail for accurate vehicle navigation, occupy approximately 3,600 megabytes of storage. These files specify the geometry of roads, geographic attribute data, and additional features such as county boundaries.

U.S. Pat. No. 5,329,108, entitled "Map with indexes for a geographical information system and system for applying same," describes a method of applying index data to the printed surface of a geographical map; the index data represents information necessary to reproduce the contents of a region of an analog printed map with which the index data is associated.

U.S. Pat. No. 5,528,518, entitled "System and method for collecting data used to form a geographic information system database," describes a portable data-acquisition device which combines a GPS receiver and a means of collecting information about objects viewable from the reference location established by the device's absolute geographical location. The device may thus collect location information that describes geography both in terms of its absolute coordinates as determined by the GPS, and with reference to notable objects near each GPS reference point.

U.S. Pat. No. 5,648,768, entitled "System and method for identifying, tabulating and presenting information of interest along a travel route," describes a database system for entering starting and destination points, retrieving route information, and presenting the route information alongside other data relevant to the route.

U.S. Pat. No. 5,614,898, entitled "Guide system," describes a system for providing supplemental information to users present in a tour bus or similar large-capacity passenger vehicle. If, for example, the bus drives near a famous building, the guide might provide basic information about the landmark, and the system might retrieve extensive historical data and present it in the form of a multimedia show.

U.S. Pat. No. 5,596,494, entitled "Method and apparatus for acquiring digital maps," describes a method for acquiring airborne stereoscopic images from satellites and correlating them with GPS coordinates in a three-dimensional space. It is subsequently possible to provide a display of actual location on real photographic maps, rather than approximated digital representations thereof. A plurality of possible GPS coordinates are thus associated with a single visual image. The satellite photographs used in this system are very large-scale and do not offer visual representations of landmarks along an individual traveler's route.

U.S. Pat. No. 5,587,911, entitled "Navigation system with selective intersection display," describes a new database format to be used for storing the data traditionally used by navigation systems. In its detailed specification, it describes an external memory "in which is stored all the data necessary for the route guidance including data for maps . . . branching points, photographs, destinations . . . and speech guidance."

U.S. Pat. No. 5,537,323, entitled "Navigation device vehicle comprising the device," describes a navigation system having a map display unit updated in accordance with changes in the user's position.

U.S. Pat. No. 5,442,557, entitled "Navigation device," describes an in-car navigation system, featuring a database of "conspicuous objects" to be consulted when assembling routing information for a given origin/destination pair. However, this patent does not mention a database including photographs of all incidental intersections or general-purpose buildings that a user might witness during the navigation process.

SUMMARY OF THE INVENTION

The present invention is an enhancement to existing computerized navigation systems, whereby standard navigational data—maps, distance measurements, and instructions to turn at specific points—are matched with a database of illustrative photographs that will show the user exactly what to look for when following a route to a destination.

According to one aspect of the invention, a system for providing navigational instructions includes a communication port, a data storage device and a processor. The communication port receives signals representing location information including a starting point and a destination point, and for transmitting the navigational instructions. The data storage device has stored therein geographical information, photographic information, route processing instructions and photograph matching instructions. The photographic information includes digital representations of photographs of actual geographic locations, and the photograph matching instructions are instructions for matching a particular photograph with a corresponding geographic location. The processor processes the location information and the geographical information in accordance with the route processing instructions to obtain a route for travel to the destination point, and matches geographic locations along the route with representations of photographs thereof in accordance with the photograph matching instructions. The processor thereby determines the navigational instructions for traveling the route including representations of photographs. The processor outputs the navigational instructions using the communication port, thereby providing an operator with navigational instructions for traveling the route and a sequence of photographic representations of the geographic locations along the route.

According to another aspect of the invention, a method of providing navigational instructions has the following steps. A first database is provided which has geographical information. A second database is provided which has photographic information; the photographic information includes representations of photographs of actual geographic locations. Each of the representations of photographs in the second database is matched with the geographical information in the first database, so that a particular photograph has associated therewith the geographical information regarding the location depicted in the photograph. The method also includes a step of receiving location information including a starting point and a destination point. The location information, the geographic information from the first database, and the photographic information from the second database are processed to determine a route for travel to the destination point. Navigational instructions for traveling the route are generated, including representations of photographs. The navigational instructions and the photographic representations of geographic locations are outputted in a sequence, thereby providing an operator with a sequence of navigational instructions and photographic representations of geographic locations along the route.

BRIEF DESCRIPTION OF THE DRAWINGS

FIG. 5 shows in tabular form the fields in the photography database.

FIG. 6 shows in tabular form the fields in the optional matching results database.

DETAILED DESCRIPTION OF THE PREFERRED EMBODIMENTS

This invention allows computer-generated driving directions to include photographs of important intersections and landmarks along the way. The system includes a database of photographs taken from several angles: for example, a four-way intersection would require a photograph for each of the four directions from which it can be approached. The system sequences these photographs and combines them with a set of driving directions (for example, "drive three miles to this intersection, and turn left on Peachtree Street")

that, taken together, guide the user to his or her destination. The photographs help the user recognize when he or she is on the correct route, and also help eliminate ambiguities that might be present in the written directions. (For example, there are dozens of streets called Peachtree in Atlanta, but thanks to the photographs, the user knows he or she needs to turn on the Peachtree Street that has a particular business on the corner).

Figure 1:
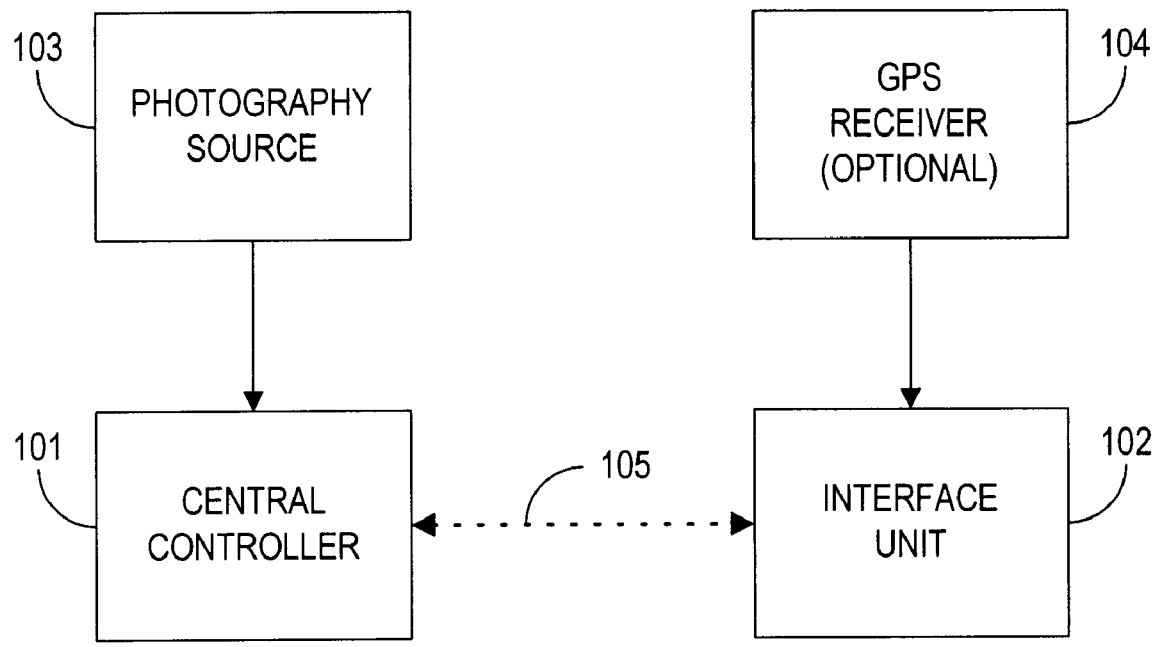
FIG. 1 is a block diagram showing an overview of the system of the present invention, including a central controller and interface unit.

An overview of a system embodying the invention is shown in FIG. 1. The system includes a central controller 101 and an interface unit 102, communicating by a communication link 105. If the interface unit 102 is remote from the central controller 101 (for example, if the interface unit 102 is installed in a motor vehicle while the central controller 101 is at a fixed location), the communication link 105 is preferably a high-speed digital communication link. In particular, the communication link 105 may be an on-line or web connection.

The central controller 101 includes a database (described in more detail below) with photographic information on various geographic locations. This information is obtained from a photography source 103, which may include for example a scanning/digitizing device for converting photographs to binary data. The photographs, of course, may be obtained by conventional methods. However, each photograph should be documented with the coordinates of the location shown and the direction of view of the photograph, in order for the photograph to be useful in presenting navigational instructions.

The central controller 101 transmits the navigational instructions to the interface unit 102 using the communication link 105. These instructions include not only directions in text form, but also photographic representations of the locations along the route to be followed.

The interface unit 102 conveys the navigational instructions to the system user (for example, the operator of a vehicle). This is done using an output device such as a display screen.

Figure 3:
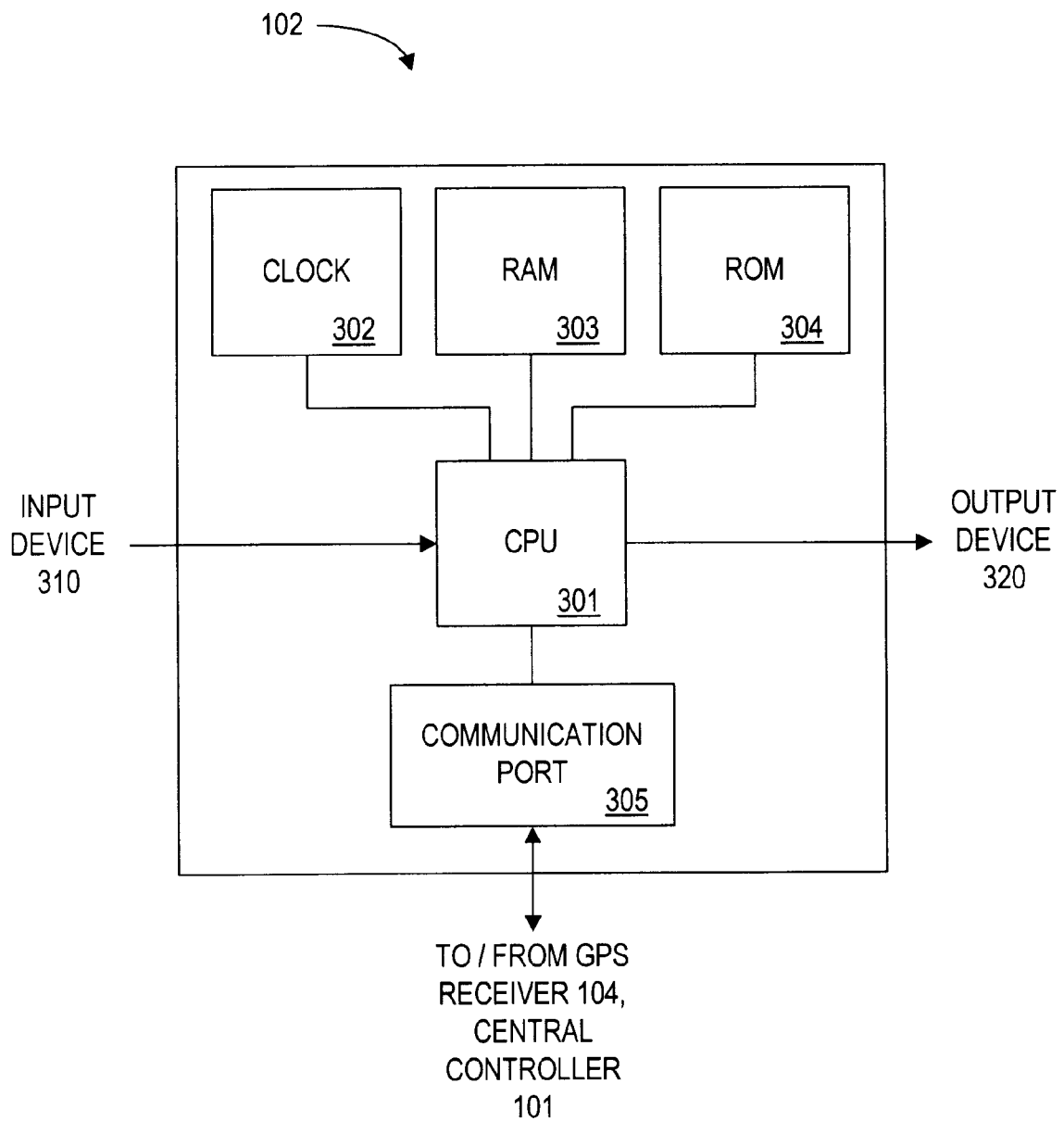
FIG. 3 is a block diagram of the interface unit.
Figure 4:
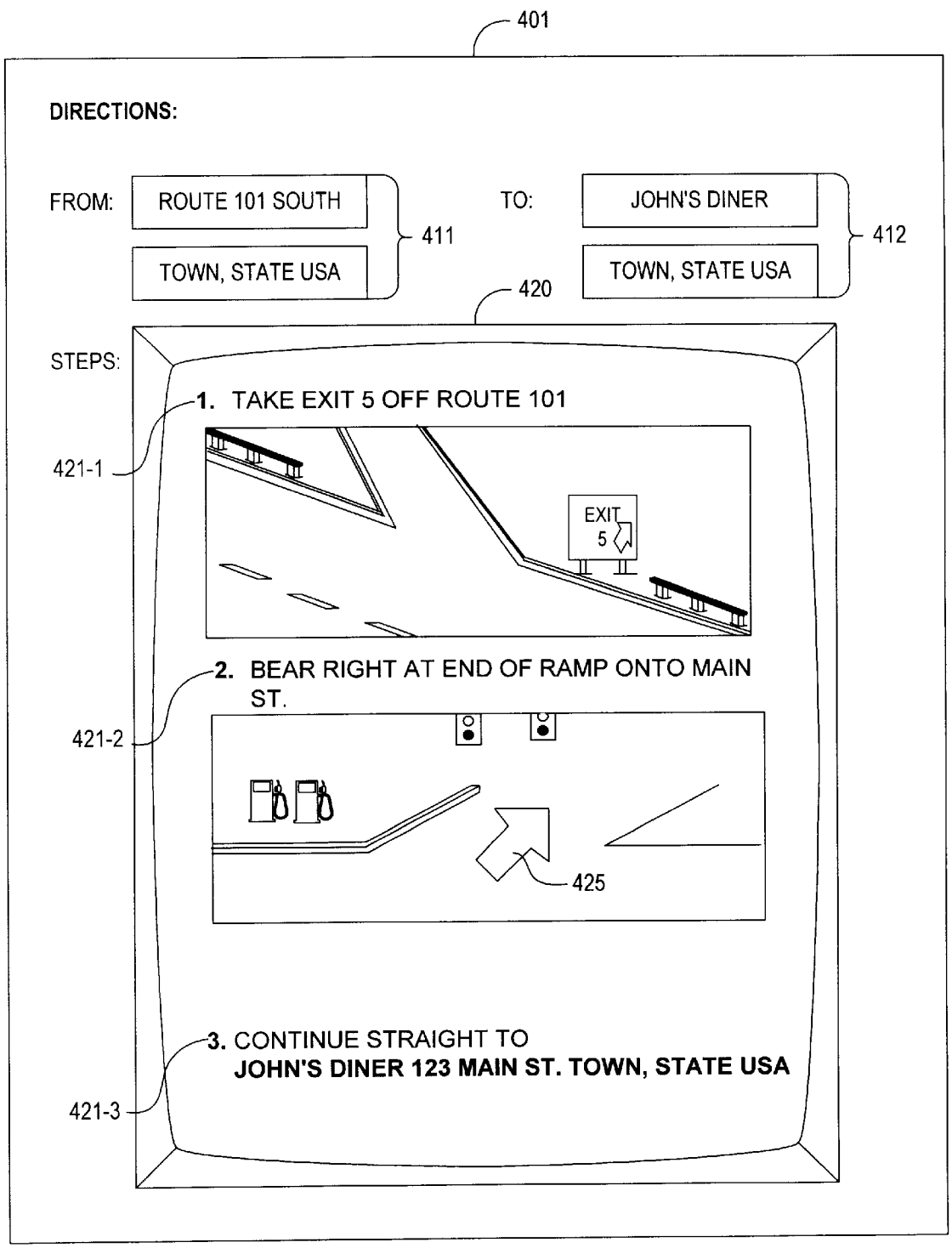
FIG. 4 is an example of possible output from the system, including representations of photographs.

Details of the interface device are shown in FIGS. 3 and 4 and discussed below.

The system user transmits the starting point of his trip and desired destination to the central controller 101 using an input device, such as a keyboard or a microphone. Alternatively, a GPS receiver 104 may be connected to the interface unit; the GPS receiver provides the current location of the user, which the central controller uses as the starting point.

Figure 2:
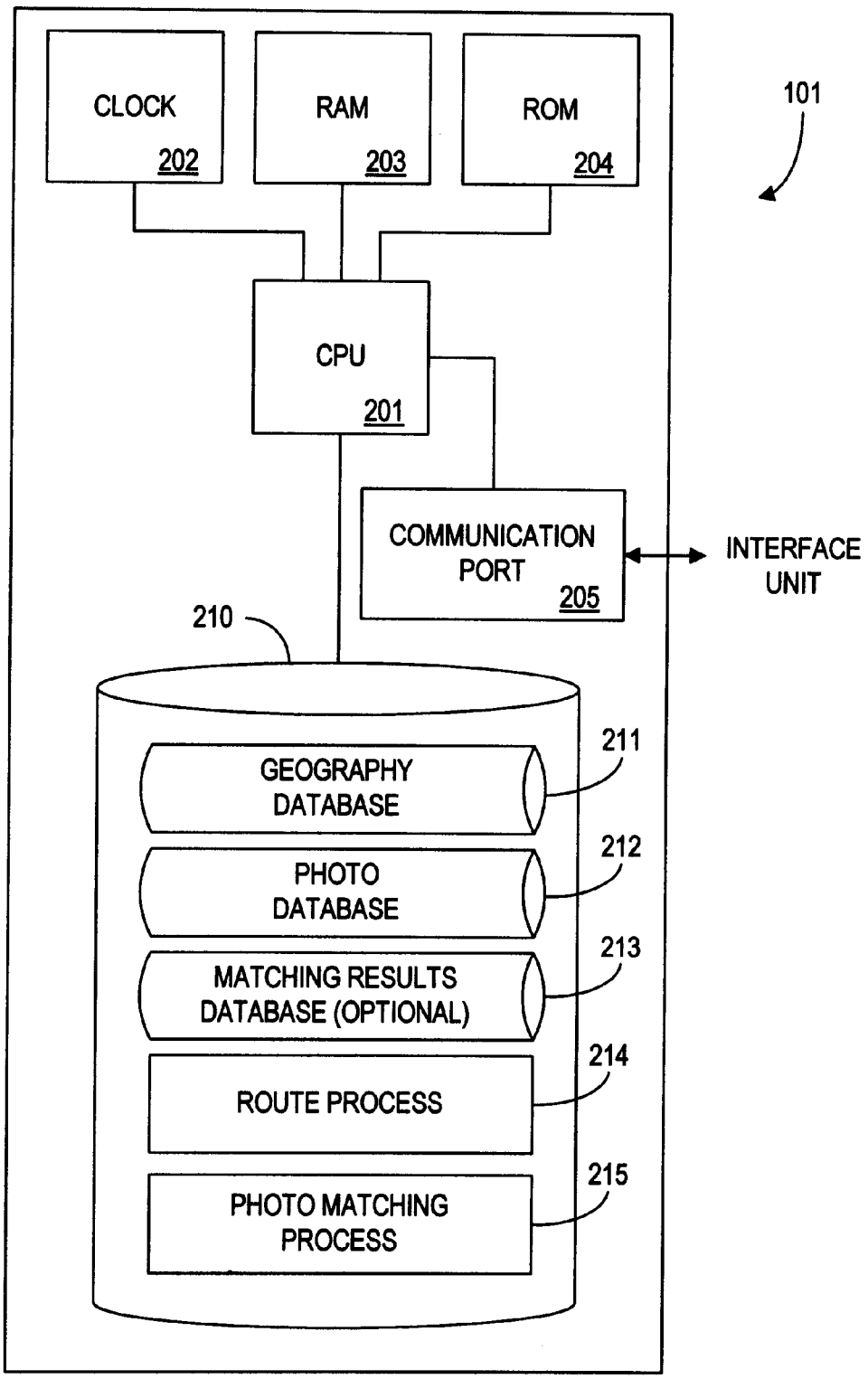
FIG. 2 is a block diagram of the central controller.

A more detailed structure of the central controller 101 is shown in FIG. 2. The central controller includes a central processing unit (CPU) 201, which is connected to a clock 202, memory units (RAM 203 and ROM 204) and a communication port 205. In addition, the CPU 201 is connected to a storage device 210, which includes a number of databases.

The communication port 205 transmits information between the interface unit 102 and the CPU 201. Specifically, the communication port receives signals from the interface unit representing the starting point and destination point of the trip for which the navigational instructions are desired. The communication port transmits those instructions to the interface unit. Software for execution by the CPU is stored in the RAM 203 and/or the ROM 204.

The databases in the storage device 210 include a geography database 211, a photography database 212, and optionally a matching results database 213 (which relates records in the geography and photography databases to each other). The storage device also includes route process software 214 for generating the navigational instructions, and photo matching process software 215 for matching geographic locations along the route with representations of photographs thereof.

FIG. 3 shows schematically the structure of the interface unit 102 according to this embodiment. The interface unit 102 includes a CPU 301, which is connected to a clock 302, RAM 303, ROM 304 and a communication port 305. The CPU 301 is connected to an input device 310 and an output device 320. Location information, such as the starting point and destination point, is input using the input device 310. The navigational instructions are output using the output device 320. The communication port 305 transmits information between the central controller 101 and the CPU 301. The optional GPS receiver 104 may be connected to the communication port 305; in the absence of a starting point input to the input device 310, the current location provided by the GPS receiver serves as the starting point. Possible examples of the input device 310 include a keyboard, microphone, touch screen, or a mouse. Possible examples of the output device 320 include a display, a speaker, or a printer.

FIG. 4 shows a possible format of the navigational instructions output by the system of the present invention, where the output device 320 is a display. The display 401 gives the starting point 411 (as input using the input device 310 or provided by the GPS receiver 104) and the destination point 412, and the navigational instructions on a screen 420. The instructions are given in a sequence of steps 421-1, 421-2, 421-3, etc. It should be noted that the instructions in each step may include either text only (as in 421-3) or a combination of text and a picture (as in 421-1 and 421-2). In the latter case, the picture displayed on the screen is a recreation of a photograph taken of the actual location mentioned in the instructions for that step. A highlight or arrow 425 may be overlaid on the picture display, pointing out the correct direction for the particular route being followed.

The structure of the photography database 212 is shown schematically in FIG. 5. Each record in this database corresponds to one photograph. A record includes an identification number 501 for the record and a representation 502 of the photograph in the form of binary data. The geographic location shown in the photograph is identified by coordinates 503 (for example, latitude and longitude) and the street address 505. In addition, the record includes the orientation 504 of the photograph; that is, the direction of view of the location shown in the photograph. Preferably the database 212 is accessible via public networks, using common protocols such as HTTP.

The geography database 211 may conveniently have a structure as is known in the art, such as the TIGER/Line database used by the U.S. Bureau of the Census. The TIGER/Line files contain point and area labels that describe landmarks' features and provide locational reference. Details regarding the format of the TIGER/Line files are available at http://www.census.gov/ftp/pub/geo/www/tiger/tigermetadata.html.

The structure of the matching results database 213 is shown schematically in FIG. 6. Each record of this database corresponds to a sequence of vectors for traveling a route from a particular starting point to a particular destination point. A record includes the starting address 601, the destination address 602, and a field 603 having identification numbers of the vectors comprising the route to be followed from the starting point to the destination point. The record also includes a field 604 having photography database record identifiers, indicating photographs that match the vectors in field 603.

Figure 7:
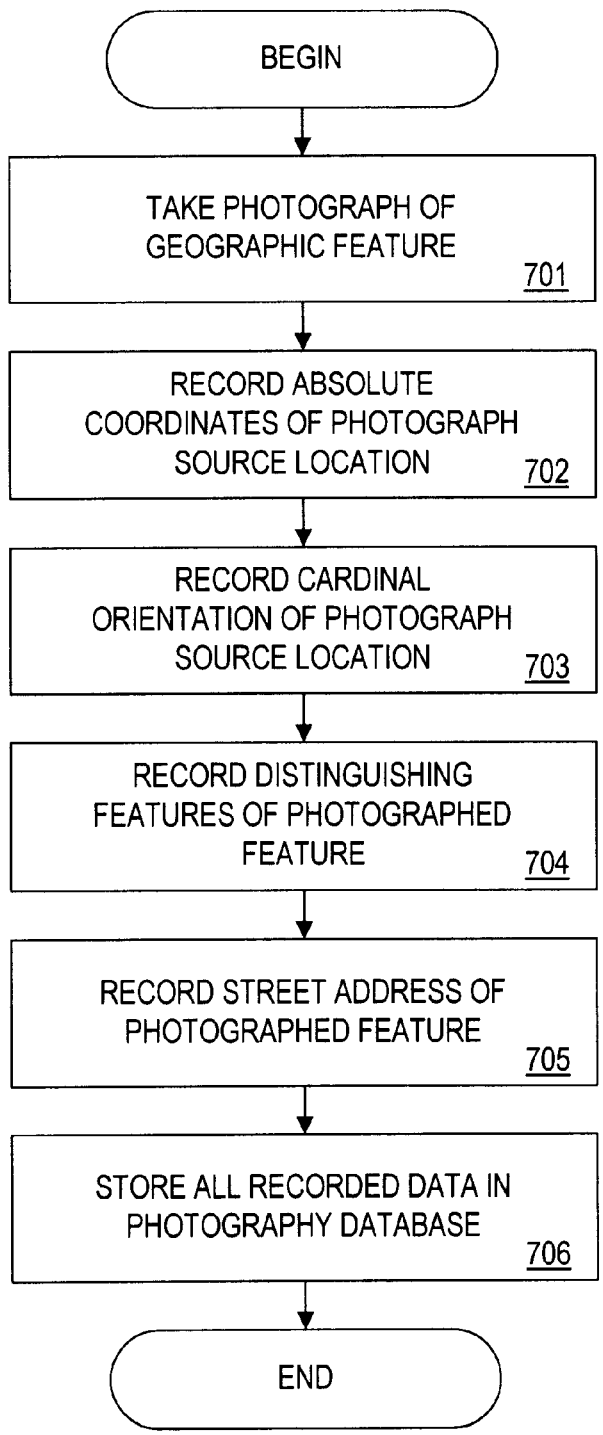
FIG. 7 is a flowchart describing the photograph acquisition, categorization, and storage process, from the data-gatherer's point of view.

FIG. 7 is a flowchart showing the process of building the photography database 211. First, a photograph of a geographic feature (such as an intersection or a landmark building) is taken (step 701). The photographer records the absolute coordinates of the location being photographed (step 702). This may conveniently be done using a mobile GPS unit. The orientation of the photograph is also recorded (step 703), as well as any distinguishing features of the geographic location being photographed (step 704). In addition, the street address of the feature is recorded (step 705). Finally, all of the recorded data is stored in the photography database (step 706).

Figure 8:
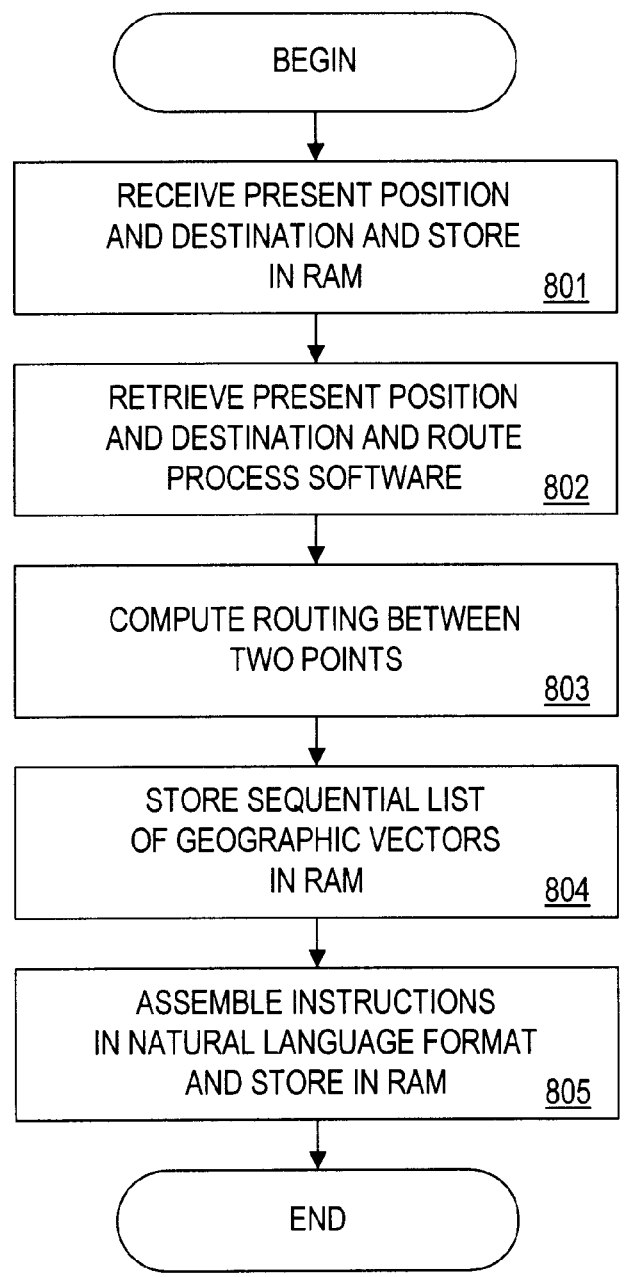
FIG. 8 is a flowchart describing the routing process executed by the navigational system.

FIG. 8 is a flowchart describing the process executed by the central controller to determine the navigational instructions. In step 801, the location information (the present position or starting point and the destination) are received from the interface unit 102 through the communication port 205; this location information is stored in RAM 203. To determine a route between the starting and destination points, the location information is first retrieved along with the route process software 214 (step 802). The CPU 201 computes the route between the starting point and destination point, using the route process software (step 803). The CPU builds a sequential list of geographic vectors to be used in following the route, and stores this list in RAM 203 (step 804). Instructions in natural language, corresponding to the sequence of vectors, are assembled and stored in RAM 203 (step 805). At this point the RAM 203 contains the results of the routing process.

Figure 9:
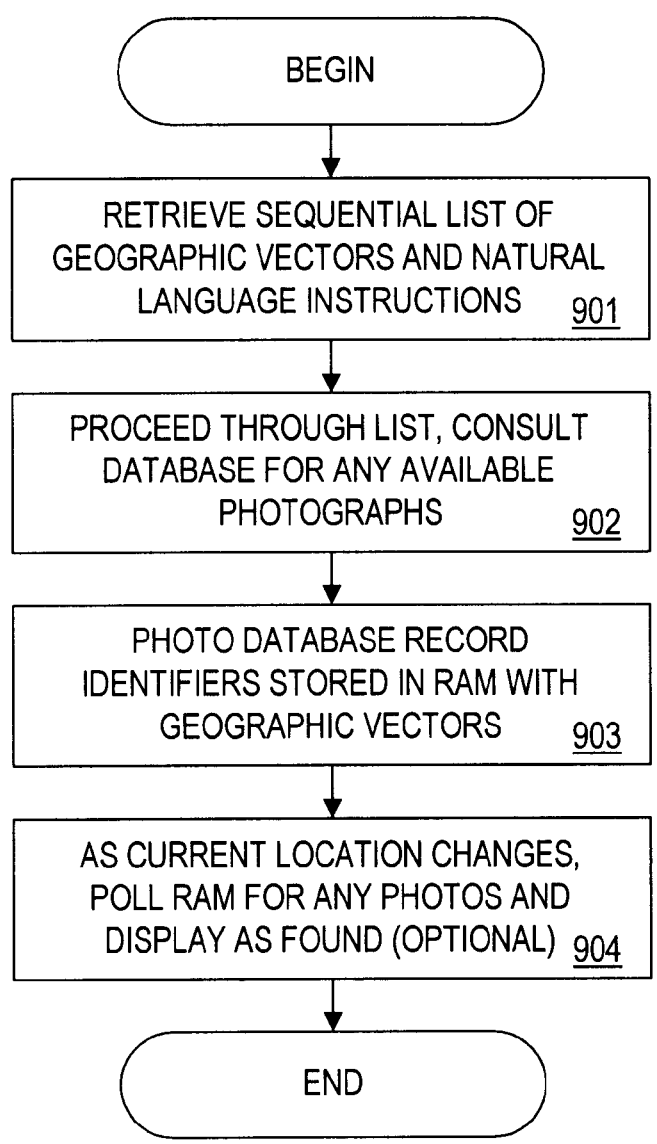
FIG. 9 is a flowchart describing the process of matching the appropriate photographs to the results of the routing process for concurrent transmission and display.

FIG. 9 shows the process of matching the appropriate photographs to the results of the routing process. This process is performed in accordance with the photo matching process software 215. In step 901, the CPU 201 retrieves the sequential list of geographic vectors and natural language instructions from the RAM 203. The CPU 201 then consults the photography database 212 for photographs corresponding to locations along the route (step 902). Specifically, for each geographic vector in the list, the database 212 is searched for source coordinates 503 and orientations 504 which match the geographic vector. If a match is found, the record identifier 501 for the photograph is stored in the RAM 203 with the geographic vectors for the route (step 903).

Optionally (step 904), if the navigational instructions are provided as the route is actually traveled, the CPU 201 may receive updates of the location information from the interface unit 102 (which may be automatically provided by GPS receiver 104). The CPU 201 retrieves instructions from RAM 203 relevant to the current location, including any matching photographs, and transmits those instructions to the interface unit 102 for sequential output, for example in display 401.

The results of the photograph matching process may advantageously be stored in the matching results database 213. Using this database, a set of vectors 603 and matching photographs 604 may be associated with a particular starting address 601 and destination address 602, thereby avoiding the need to repeatedly compute the route between addresses 601 and 602 and search the photography database 212 for appropriate photographs.

Figure 10:
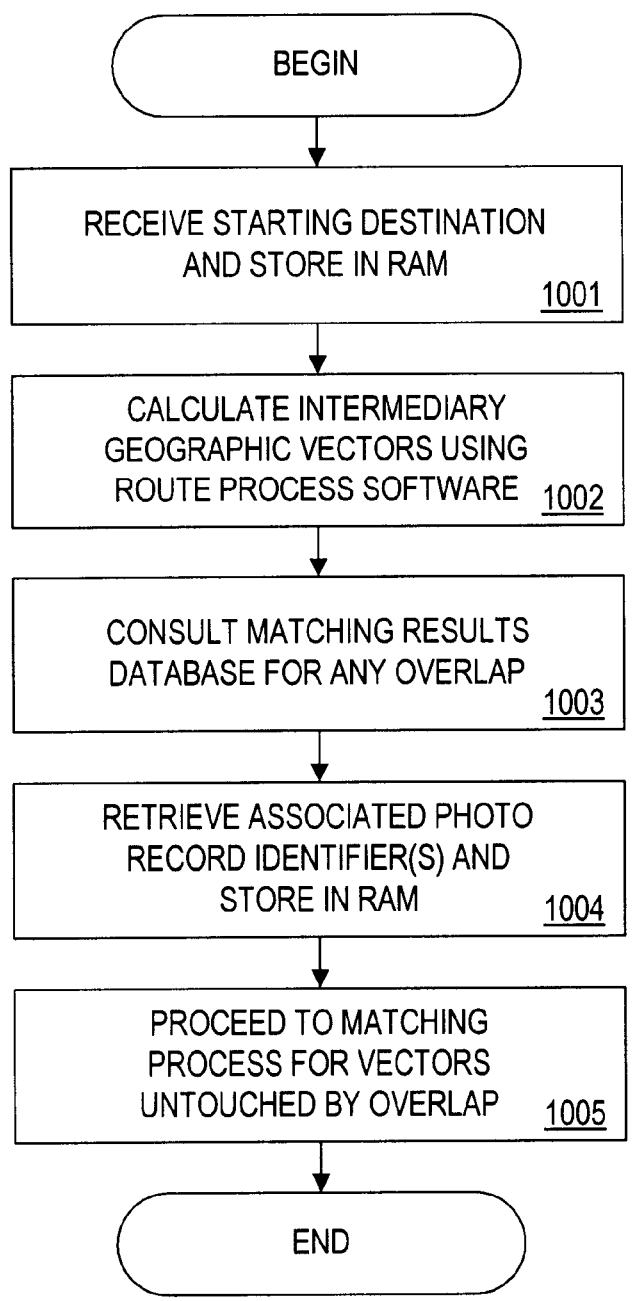
FIG. 10 is a flowchart describing the process of checking the matching results database for overlap between an active query and all previously-stored queries, and retrieving any relevant data for further processing as described in FIG. 8.

The matching results database 213 may also be used in generating instructions for traveling between addresses not yet in the database. This process is shown schematically in FIG. 10. In step 1001, the starting and destination points are received and stored in RAM 203 (as in step 801). The geographic vectors for a route between the starting and destination points are calculated, using the route process software 214 (step 1002). The CPU 201 then consults the matching results database 213 (step 1003), searching for an overlap between the vectors just calculated and the geographic vectors 603 in the database.

If an overlap is found (step 1004), the CPU 201 then retrieves the common photographic record identifiers 604 for the photographs associated with those vectors and stores those identifiers in the RAM 203. The full photographic matching process is then performed for those vectors not found in the matching results database 213 (step 1005). This procedure thus minimizes the need to perform new photograph matching when a new route is calculated.

The operation of the system of this embodiment may be illustrated by the following example. A family moves to a new city, and needs to find the way from their house to the new school their children will attend. The route consists primarily of smaller roads, so there will not be significant signage of the same kind that might be found when traveling on an expressway.

According to this embodiment of the invention, a sequence of directions might be displayed in display 401 as follows:

Starting address 411: 123 Anyroad St.

Destination address 412: Placetown High School.

The steps to be followed (421-1, 421-2, etc. in FIG. 4) are displayed, with the display 401 updating as the vehicle approaches the locations described:

1. Begin by following direction indicated by arrow on system display.
2. At corner of Anyroad and 49th, turn right. (Accompanying this instruction is a display of a photograph of the intersection of Anyroad and 49th, as viewed from the direction currently followed by the vehicle.)
3. Follow 49th to East Boulevard before train tracks, turn right. (Accompanying this instruction is a display of a photograph of the intersection of 49th and East Boulevard, showing the train tracks and highlighting the area towards which the vehicle should turn.)
4. Follow East Boulevard across 41st. (Accompanying this instruction is a display of a photograph of a landmark building such as a fast-food restaurant.)
5. Continue to corner of East Boulevard and 37th, school is on right-hand-side. (Accompanying this instruction is a display of a photograph of Placetown High School as viewed from East Boulevard.)

It should be noted that the actual street address of the high school need not be known. Furthermore, if the family's vehicle has a GPS receiver 104, the system can automatically determine the vehicle's position. In that case the user does not need to input the starting address.

The present invention has been described in the context of an interface unit 102 which is remote from a central controller 101. However, the invention is not limited to this embodiment. A large number of photographs is required for the system to be useful throughout the United States or internationally. The database 212 of photography information is likely to be correspondingly large. It therefore may be preferable to have the storage device 210 located remotely from the interface unit 102, whether or not the interface unit 102 is remote from the central controller 101.

In general, the interface unit 102 may comprise any system whereby the user may specify a destination and receive guidance from the central controller 101. If each photograph is stored with a textual description (for example, "a restaurant with red brick walls" or "an intersection with banks on three of the four corners") then a visual display unit may not even be required.

The communication link 105 may be any suitable communication path. In a local application, the communication link 105 may be a direct connection. Preferably, the communication link 105 is a remote, network-based connection (for a web site application).

In an alternative embodiment, the interface unit 102 is installed in a motor vehicle, so that the system of the present invention is a mobile navigational system with the interface unit 102 communicating with a fixed central controller 101. In a further alternative embodiment, the vehicle has a GPS receiver 104 installed therein, so that the central controller 101 is automatically provided with the current location of the vehicle.

The complete sequence of navigational instructions (including the representations of photographs) may be transmitted to the interface unit 102 at the beginning of the trip and stored in the RAM 303. Alternatively, the instructions may be transmitted in stages as the trip progresses. As digital bandwidth available to mobile sites increases, it will become easier to transmit photographic data to vehicles in transit, thereby reducing the storage requirements of the RAM 303 of the interface unit 102.

The central controller 101 may alternatively generate the navigational instructions and retrieve the appropriate photographs on an as-needed basis while the route is being followed with no perceptible delay to the user. The effectiveness of this approach depends on the speed of the CPU 201 and the data handling capability of the communication link 105.

In another alternative embodiment, business logos could be used as a substitute for, or a supplement to, photography. By accessing a system such as the Yellow Pages® the central controller 101 could identify businesses along the user's route and use their logos to illustrate the directions it generates. This would substantially reduce the size of the photography database 212 and avoid the considerable effort involved of gathering photographs of large numbers of landmarks and intersections.

While the present invention has been described above in terms of specific embodiments, it is to be understood that the invention is not limited to the disclosed embodiments. On the contrary, the present invention is intended to cover various modifications and equivalent structures included within the spirit and scope of the appended claims.

We claim:

1. A system adapted to provide navigational instructions, the system comprising:
   a communication port adapted to:
      receive signals representing location information including a starting point and a destination point; and
      transmit the navigational instructions;
   a storage device having stored therein geographical information, photographic information, route processing instructions and photograph matching instructions, wherein:
      the photographic information includes representations of photographs of actual geographic locations and photograph orientation information;
      for each representation of a photograph, the photographic information includes coordinates of a location shown in the representation of the photograph and a direction of view of the representation of the photograph; and
      the photograph matching instructions include instructions adapted to match coordinates of a representation of a particular photograph with a corresponding geographic location; and
   a processor connected to the storage device and adapted to:
      communicate with the storage device;
      process the location information and the geographical information in accordance with the route processing instructions to obtain a route for travel to the destination point;
      match geographic locations along the route with the coordinates of representations of photographs thereof in accordance with the photograph matching instructions; and
      orient the representations of photographs based on the route for travel, thereby determining the navigational instructions for traveling the route including oriented representations of photographs,
      wherein said processor outputs the navigational instructions using said communication port, thereby providing a user with directions for traveling the route and an oriented sequence of photographic representations of the geographic locations along the route.

2. A system according to claim 1, wherein said system is installed in a vehicle.

3. A system according to claim 1, further comprising a device for automatically determining the starting point.

4. A method of providing navigational instructions, the method comprising:
   providing a first database having geographical information;
   providing a second database having photographic information including representations of photographs of actual geographic locations, the second database also providing orientation information associated with each of the representations of photographs, for each representation of a photograph, the photographic information including coordinates of a location shown in the representation of the photograph and the orientation information including a direction of view of the representation of the photograph;
   receiving location information including a starting point and a destination point;
   processing the location information, the geographical information from the first database, the photographic information from the second database, and the orientation information from the second database to determine a route for travel to the destination point;
   generating navigational instructions for traveling the route including representations of photographs oriented based on the route for travel; and
   outputting the navigational instructions and the photographic representations of geographic locations in an oriented sequence, thereby providing a user with a sequence of navigational instructions and oriented photographic representations of geographic locations along the route.

5. A method according to claim 4, wherein the navigational instructions are outputted to an operator of a vehicle.

6. A method according to claim 4, further comprising the step of automatically determining the starting point using a positioning device.

* * * * *

US006199014C1

(12) INTER PARTES REEXAMINATION CERTIFICATE (1073rd)

United States Patent
Walker et al.

(10) Number: US 6,199,014 C1
(45) Certificate Issued: Mar. 20, 2015

(54) SYSTEM FOR PROVIDING DRIVING DIRECTIONS WITH VISUAL CUES

(75) Inventors: Jay S. Walker, Ridgefield, CT (US); Toby Weir-Jones, Vancouver (CA)

(73) Assignee: Walker Digital, LLC, Stamford, CT (US)

Reexamination Request:
No. 95/002,031, Jun. 26, 2012

Reexamination Certificate for:
Patent No.: 6,199,014
Issued: Mar. 6, 2001
Appl. No.: 08/997,677
Filed: Dec. 23, 1997

(51) Int. Cl.
*G01C 21/34* (2006.01)
*G01C 21/36* (2006.01)

(52) U.S. Cl.
CPC ................................. *G01C 21/3647* (2013.01)
USPC .................... 701/428; 701/533; 340/995.2

(58) Field of Classification Search
None
See application file for complete search history.

(56) References Cited

To view the complete listing of prior art documents cited during the proceeding for Reexamination Control Number 95/002,031, please refer to the USPTO's public Patent Application Information Retrieval (PAIR) system under the Display References tab.

*Primary Examiner* — Christopher E Lee

(57) ABSTRACT

A system and method are described for providing navigational instructions including representations of photographs of geographical locations along the route to be traveled. Geographical information and photographic information are stored in databases; the photographic information includes representations of photographs of actual geographic locations. The coordinates of each location photographed are also stored. Each of the representations of photographs is matched with the geographical information, thereby associating the photograph with the geographical information regarding the location depicted therein. The starting and destination points, geographic information and photographic information are processed to determine a route for travel to the destination point. Navigational instructions for traveling the route are generated, including representations of photographs. The navigational instructions and the photographic representations of geographic locations are outputted in a sequence, thereby providing a sequence of directions and photographic representations of geographic locations along the route.

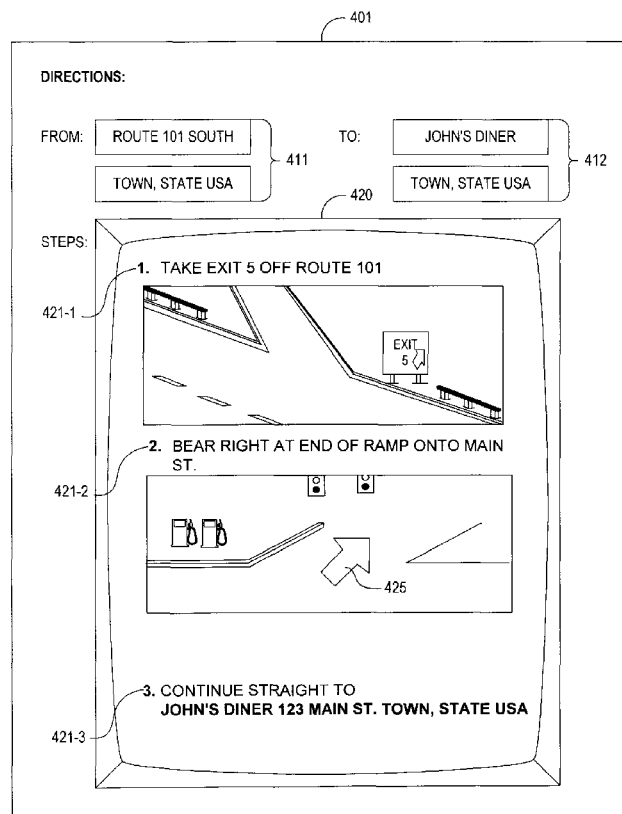

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-6 are cancelled.

\* \* \* \* \*